United States Patent
Narimatsu et al.

(10) Patent No.: US 7,788,853 B2
(45) Date of Patent: Sep. 7, 2010

(54) DOOR TRIM FOR VEHICLE

(75) Inventors: Tetsuya Narimatsu, Aichi (JP); Mitsuru Serifu, Aichi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 138 days.

(21) Appl. No.: 11/923,073

(22) Filed: Oct. 24, 2007

(65) Prior Publication Data
US 2008/0256875 A1   Oct. 23, 2008

(30) Foreign Application Priority Data
Oct. 31, 2006   (JP)   ............... 2006-295909

(51) Int. Cl.
    *B60J 5/04*   (2006.01)
(52) U.S. Cl. ............ 49/502; 49/479.1; 296/146.7
(58) Field of Classification Search ........... 49/475.1, 49/479.1, 502; 296/146.7
    See application file for complete search history.

(56) References Cited

U.S. PATENT DOCUMENTS

| | | | |
|---|---|---|---|
| 4,277,099 A | 7/1981 | Klein et al. | |
| 5,111,617 A * | 5/1992 | Saiga | 49/493.1 |
| 5,906,409 A | 5/1999 | DeRees et al. | |
| 6,138,415 A | 10/2000 | Ohtsu et al. | |
| 6,802,666 B1 * | 10/2004 | Bormann et al. | 403/233 |
| 7,077,450 B2 | 7/2006 | Kohara et al. | |
| 2005/0140166 A1 | 6/2005 | Dry et al. | |
| 2006/0017306 A1 * | 1/2006 | Smith et al. | 296/146.7 |
| 2007/0029836 A1 * | 2/2007 | DeWolfe et al. | 296/146.7 |

FOREIGN PATENT DOCUMENTS

| | | |
|---|---|---|
| JP | 63-16235 U | 2/1988 |
| JP | 63-44821 U | 3/1988 |
| JP | 03224846 A * | 10/1991 |
| JP | 2000-289465 | 10/2000 |

OTHER PUBLICATIONS

English language Abstract of JP 2000-289465 A.

* cited by examiner

*Primary Examiner*—Jerry Redman
(74) *Attorney, Agent, or Firm*—Greenblum & Bernstein, P.L.C.

(57) ABSTRACT

A door trim for vehicle in which a sub seal that seals the gap between a door trim body and a scuff plate is mounted, and an insertion hole is provided, into which at least one of both end portions of the sub seal is inserted. The sub seal is preferably mounted over a corner portion connecting a lower edge portion and a side edge portion of the door trim body.

2 Claims, 4 Drawing Sheets

DOOR TRIM FOR VEHICLE

CROSS REFERENCE TO RELATED APPLICATION

This application claims priority from Japanese Patent Application No. 2006-295909 filed Oct. 31, 2006. The entire content of this priority application is incorporated herein by reference.

TECHNICAL FIELD

The present invention relates to a door trim for vehicle provided with a sub seal that seals the gap between a door trim body and a scuff plate.

BACKGROUND

As a seal structure around a door when a vehicle door is closed, such a structure has been known that a sub seal made from a lengthy urethane rubber or the like is mounted at a lower edge portion of the door trim for vehicle and the sub seal is brought into contact with a scuff plate disposed on an upper face of a rocker panel of the vehicle (See Japanese Patent Laid-Open No. 2000-289465, Japanese Utility Model Laid-Open No. 63-16235 and Japanese Utility Model Laid-Open No. 63-44821).

However, in the conventional seal structure around the door, terminal of a lengthy sub seal 100 mounted along the lower edge portion of a door trim 106 is not processed. Therefore, as shown in FIG. 4, when the vehicle door is opened/closed, a passenger sees a hollow section 102 exposed at an end portion 100a of the sub seal 100, which is not desirable in appearance. There can be methods for closing the hollow section 102 by rounding the end portion 100a of the sub seal 100 or by blocking it with heat welding or the like, but a processing process for the end portion 100a separately from a molding process of the sub seal 100 becomes necessary in this case, which causes a problem of rise in manufacturing costs of the sub seal 100.

Also, in the conventional seal structure around the door, the sub seal 100 is mounted to the lower edge portion of the door trim 106 with a fitting 104 such as a clip or staple, but the end portion 100a of the sub seal 100 not supported by the fitting 104 hangs downward, which causes a problem that the hanging end is seen when the door is opened/closed and is not desirable in appearance.

The present invention was made in view of the above circumstances and has an object to improve the appearance of the end portion of the sub seal in the door trim for vehicle in which the sub seal is mounted to the door trim body. Also, another object of the present invention is to prevent the end portion of the sub seal from hanging downward.

SUMMARY

A first invention is a door trim for vehicle in which a sub seal that seals the gap between a door trim body and a scuff plate is mounted, the door trim body being provided with an insertion hole into which at least one of both ends of the sub seal is inserted.

According to the first invention, since the end portion of the sub seal is inserted into the insertion hole formed at the door trim body, the end portion of the sub seal can be concealed. Therefore, without applying separate processing or the like to the end portion of the sub seal, the section of the end portion of the sub seal is prevented from being exposed to the outside and seen by passengers.

Also, according to the first invention, since the end portion of the sub seal is inserted into the insertion hole formed at the door trim body, the end portion of the sub seal is supported by the insertion hole. Therefore, the end portion of the sub seal is prevented from hanging downward.

Moreover, according to the first invention, only by providing an insertion hole in the door trim body, the end portion of the sub seal can be concealed from the view of the passengers with an extremely simple process.

A second invention is the door trim for vehicle of the first invention in which the sub seal is mounted over a corner portion connecting the lower edge portion and the side edge portion of the door trim body.

According to the second invention, it is possible to have the sub seal follow the corner portion connecting the lower edge portion and the side edge portion of the door trim body. That is because since the end portion of the sub seal is inserted into the insertion hole, the end portion of the sub seal is supported by the insertion hole so that it does not hang downward. Therefore, even if the sub seal is mounted over the corner portion, the end portion of the sub seal does not hang downward. Therefore, the appearance of the subseal is improved.

According to the present invention, in the door trim for vehicle in which the sub seal is mounted to the door trim body, the appearance of the end portion of the sub seal can be improved. Also, the end portion of the sub seal can be prevented from hanging downward.

DETAILED DESCRIPTION OF THE PREFERRED ILLUSTRATIVE EMBODIMENTS

Illustrative embodiment of the present invention will be described below in detail referring to the attached drawings.

Figure 1:
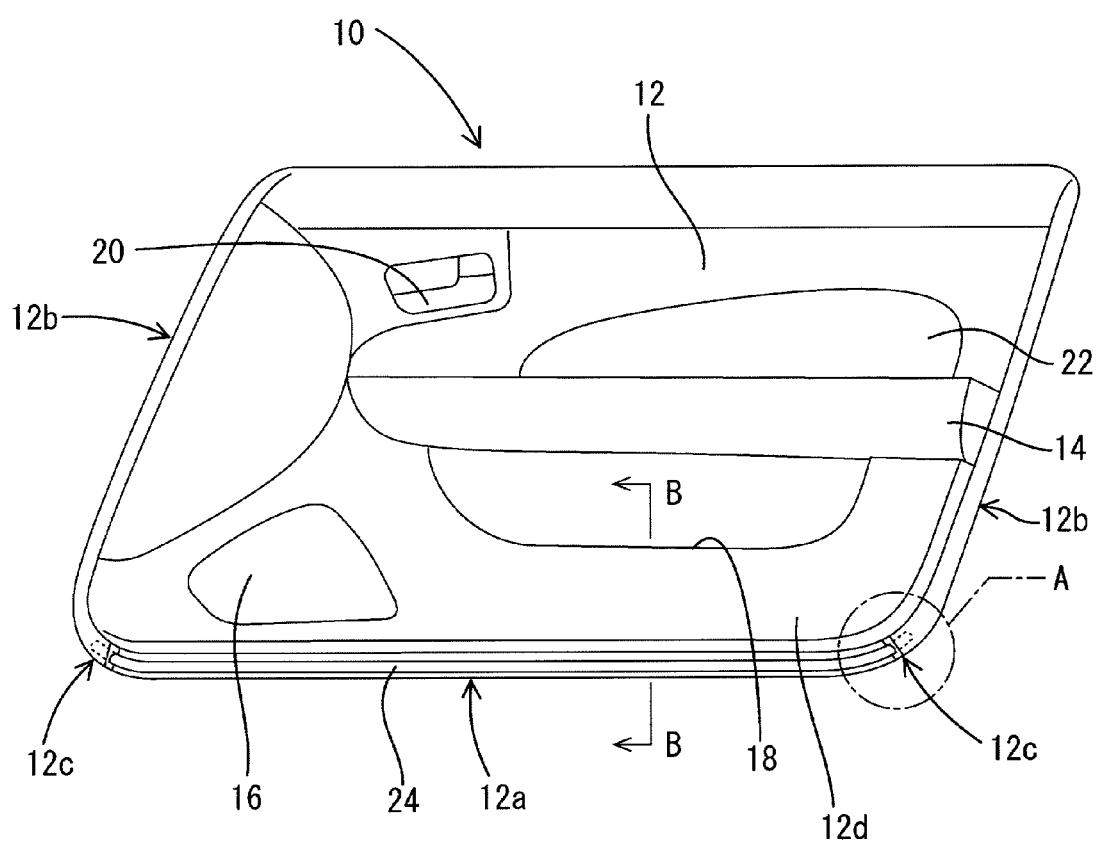
FIG. 1 is an entire view of a door trim.

FIG. 1 is an entire view of a door trim 10 according to this embodiment.

The door trim 10 is mounted as an interior material on a interior side of a door inner panel 50 of a vehicle. The door trim 10 has a door trim body 12 molded in a board shape from a synthetic resin material, and the door trim body 12 is equipped with various devices such as an arm rest portion 14 used as an arm rest for a passenger, a speaker 16, a door pocket 18, an inside handle 20, an ornament 22 and the like.

Figure 2:
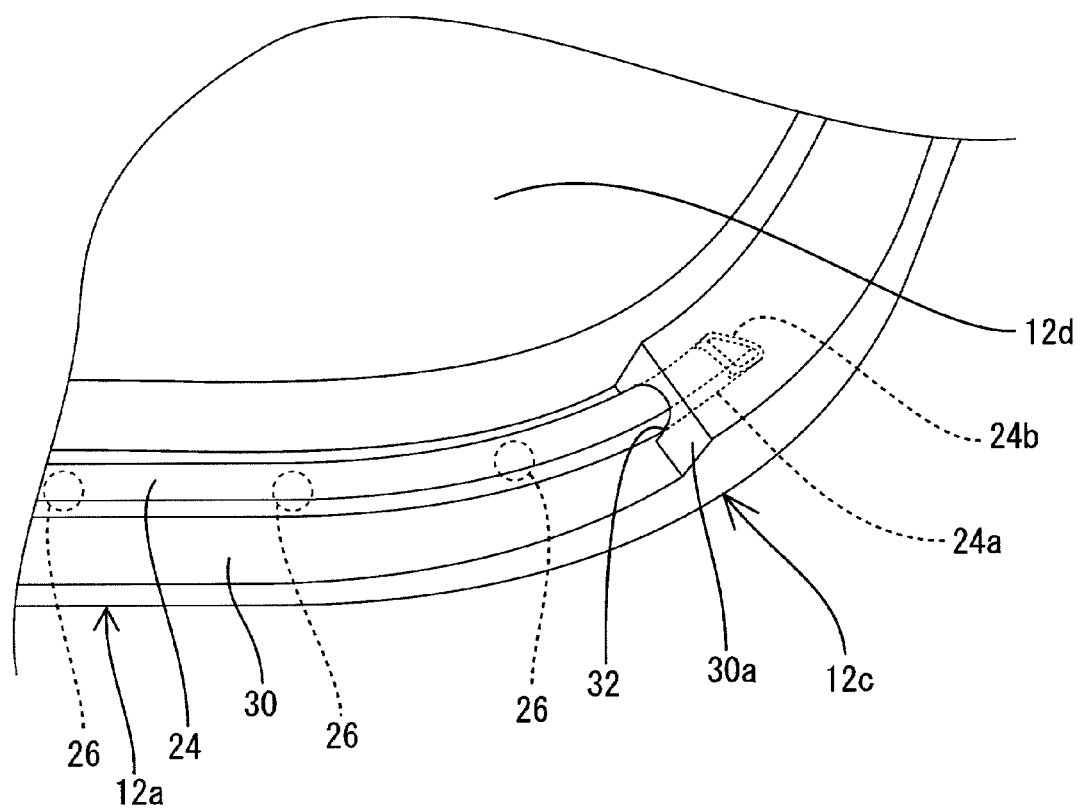
FIG. 2 is an enlarged perspective view of an A part of the door trim shown in FIG. 1.

FIG. 2 is an enlarged perspective view of an A part of the door trim 10 shown in FIG. 1.

As shown in FIGS. 1 and 2, a stepped portion 30 is formed at a lower edge portion 12a of the door trim body 12. The stepped portion 30 is formed in a stepped state. The stepped portion 30 is depressed from a surface portion 12d of the door trim body 12. The stepped portion 30 is formed in an elongated state in the longitudinal direction of the vehicle (right and left direction in FIGS. 1 and 2).

Also the stepped portion 30 is formed over a corner portion 12c. The corner portion 12c is connecting a lower edge portion 12a and right and left side edge portions 12b of the door trim body 12. A lengthy sub seal 24 that seals the gap between the door trim body 12 and a scuff plate 40 is mounted on the stepped portion 30.

The sub seal 24 is a pipe-like member molded from an elastic material such as urethane rubber. The sub seal 24 can be molded by an extrusion molding machine, for example. The sub seal 24 is mounted by a fitting such as a clip 26 on the stepped portion 30 (See FIG. 3).

Figure 3:
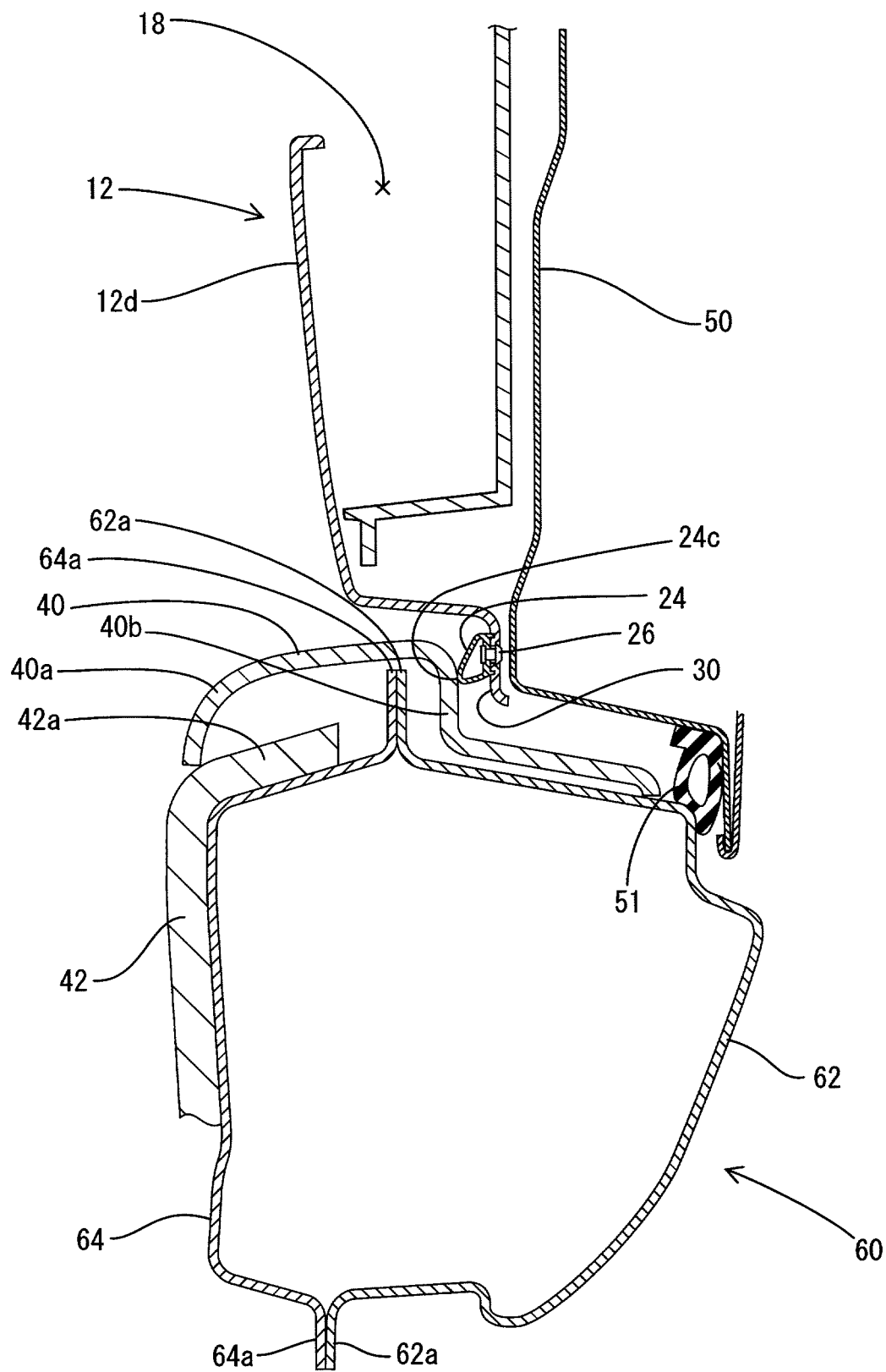
FIG. 3 is a B-B line sectional view of the door trim shown in FIG. 1.
Figure 4:
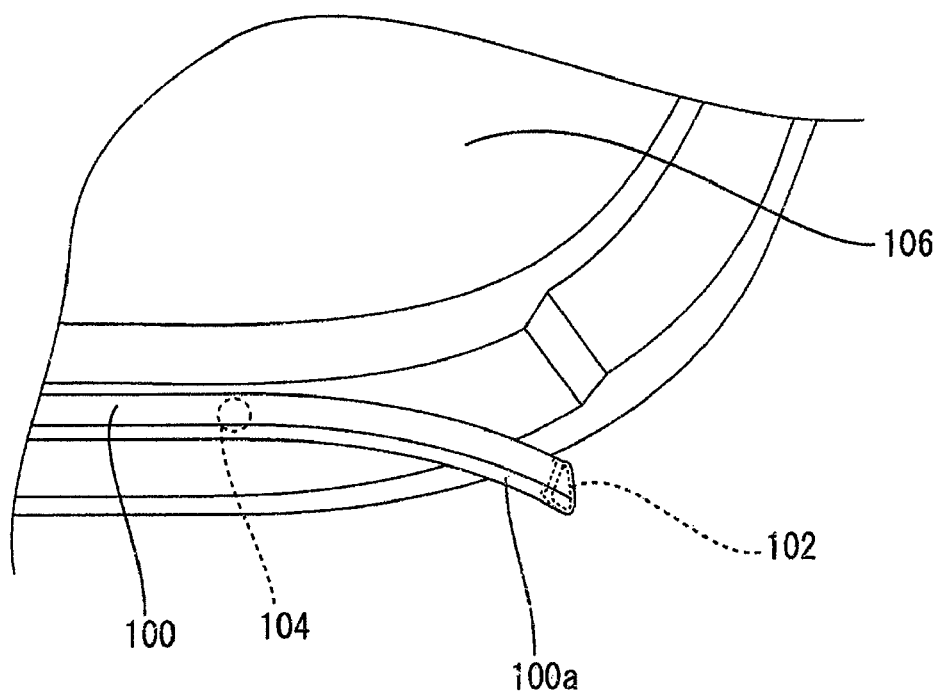
FIG. 4 is a perspective view illustrating an end portion of a sub seal in a conventional door trim.

FIG. 3 is a B-B line sectional view of the door trim 10 shown in FIG. 1. FIG. 3 illustrates a state where the door trim body 12 is mounted to the interior side of the door inner panel 50 in the vehicle and the sub seal 24 seals the gap between the door trim body 12 and the scuff plate 40.

As shown in FIG. 3, a rocker panel 60 constitutes a lower frame of a door-opening of the vehicle. The rocker panel 60 is comprised of a rocker outer panel 62 and a rocker inner panel 64. The rocker outer panel 62 and the rocker outer panel 64 are bonded at their respective flange portions 62a, 64a.

As shown in FIG. 3, at the upper part of the rocker panel 60, a scuff plate 40 covers the flange portions 62a, 64a. The scuff plate 40 is molded in the plate shape from a rigid synthetic resin or the like. A floor mat 42 is disposed above the rocker inner panel 64, and the scuff plate 40 is disposed so that an outer edge portion 42a of the floor mat 42 in the car width direction is held by an inner edge portion 40a of the scuff plate 40 from above.

As shown in FIG. 3, the sub seal 24 has a hollow section substantially in the triangular shape, and a distal end portion 24c of the substantially triangular section of the sub seal 24 is brought into contact with a vertical wall portion 40b formed substantially at the center in the car width direction of the scuff plate 40. By this arrangement, when the vehicle door is closed, the sub seal 24 seals the gap between the door trim body 12 and the scuff plate 40. As a result, intrusion of dusts or water from outside into the compartment and noises such as a road noise are blocked by the sub seal 24. In general, a weather strip 51 is mounted around the vehicle door. The weather strip 51 is mounted surrounding the outside of the sub seal 24. Therefore, the periphery of the vehicle door is sealed doubly by the weather strip 51 and the sub seal 24.

As shown in FIG. 2, a vertical wall portion 30a is formed so as to rise toward the interior side of the vehicle. The vertical wall portion 30a is formed at the rear end of the stepped portion 30 formed at the lower edge portion 12a of the door trim body 12.

An insertion hole 32 is provided at the vertical wall portion 30a, and an end portion 24a on the rear side of the vehicle in the sub seal 24 is inserted into the insertion hole 32.

Therefore, according to the door trim 10 of this embodiment, since the end portion 24a of the sub seal 24 is inserted into the insertion hole 32, a end face 24b of the end portion 24a of the sub seal 24 is prevented from being exposed to the outside and being seen by passengers. As a result, the door trim 10 with a good appearance and high commercial value can be realized.

Also, it is only necessary to provide the insertion hole 32 in the door trim body 12, and processing to conceal the end portion 24a of the sub seal 24 can be realized with an extremely simple process. Therefore, the door trim 10 with the end portion 24a concealed and having a good appearance can be manufactured without increasing the manufacturing cost of the door trim 10.

Also, the end portion 24a of the sub seal 24 is inserted into the insertion hole 32 and the end portion 24a of the sub seal 24 is supported by the insertion hole 32 in this structure. Thus, the end portion 24a of the sub seal 24 is prevented from hanging downward.

Also, according to the door trim 10 of this embodiment, it is possible to have the sub seal 24 follow along the curved shape of a corner portion 12c connecting the lower edge portion 12a and the side edge portion 12b of the door trim body 12. That is because the end portion 24a of the sub seal 24 is strongly supported by the insertion hole 32.

Therefore, even if the sub seal 24 is mounted over the corner portion 12c, the end portion 24a of the sub seal 24 curved upward is prevented from hanging downward by an elastic return force.

In the above embodiment, the corner portion 12c on the rear side of the vehicle ('A' part in FIG. 1) has been described, but the configuration is substantially the same for the corner portion 12c on the front side of the vehicle.

Other Embodiments

With embodiments of the present invention described above with reference to the accompanying drawings, it is to be understood that the invention is not limited to those precise embodiments, and the embodiments as below, for example, can be within the scope of the present invention.

(1) In the above embodiment, an example in which both end portions 24a of the sub seal 24 are inserted into the insertion hole 32, respectively, provided at the door trim body 12 was shown, but not limited to that. For example, a case where only one of the end portions 24a of the sub seal 24 is inserted into the insertion hole 32 is also included in the technical scope of the present invention.

(2) In the above embodiment, an example in which the sub seal 24 is mounted on the stepped portion 30 with the clip 26 was shown, but not limited to that. Means for mounting the sub seal 24 is not particularly limited but the sub seal 24 can be mounted by a metal staple, an engaging claw made of a resin or the like, for example. Alternatively, the sub seal 24 can be mounted onto the surface of the stepped portion 30 with an adhesive.

(3) In the above embodiment, an example in which the sub seal 24 is molded in a hollow pipe shape was shown, but not limited to that. The sub seal 24 may be molded in the solid state.

(4) In the above embodiment, an example in which the stepped portion 30 is provided at the lower edge portion 12a of the door trim body 12 and the sub seal 24 is mounted on the stepped portion 30, but not limited to that. For example, a case where the sub seal 24 is mounted to the surface portion 12d of the door trim body 12 and the insertion hole 32 is provided in the vertical wall portion formed so as to rise from the surface portion 12d toward the interior side of the vehicle is also included in the technical scope of the present invention.

What is claimed is:

1. A door trim for use with a vehicle having a scuff plate that covers a lower door-opening frame portion of the vehicle, the door trim comprising:

a door trim body including a surface portion, a stepped portion, a vertical wall portion, and an insertion hole; and a sub seal, wherein:

the insertion hole is configured such that the sub seal communicates with a compartment inner side of the door trim body and a compartment outer side of the door trim body;

the stepped portion is configured at a lower portion of the door trim body and is depressed in a stepwise manner from a surface portion of the door trim body and extends in the longitudinal direction of the vehicle;

the vertical wall portion is disposed at at least one end of the stepped portion and extends toward an interior side of the vehicle;

the insertion hole is disposed at the vertical wall portion;

the sub seal is disposed on, and extends along, the stepped portion so as to seal a gap between the scuff plate and the door trim body; and the sub seal further extends through the insertion hole so that at least one end portion thereof is disposed on the compartment outer side of the door trim body and concealed from the compartment inner side of the door trim body.

2. The door trim according to claim 1, wherein:

the vertical wall portion includes two vertical walls, each of the two vertical walls is disposed at opposite ends of the stepped portion;

the door trim body includes a lower edge portion, two side edge portions, and two corner portions;

the two corner portions connect the lower edge portion with each of the respective two side edge portions;

each of the two vertical walls is disposed at one of the respective two corner portions; and opposite end portions of the sub seal are inserted into each of the respective insertion holes disposed at each of the two vertical walls at the two corner portions of the door trim body.

* * * * *